(12) United States Patent
Dourthe et al.

(10) Patent No.: US 8,131,574 B2
(45) Date of Patent: Mar. 6, 2012

(54) AIR TRAVEL SYSTEM AND METHOD FOR PLANNING ROUNDTRIP FLIGHTS USING ONE WAY COMBINABLE FARES

(75) Inventors: Cedric Dourthe, Nice (FR); Thierry Dufresne, Nice (FR); Thierry Blaszka, Nice (FR); Michael Pedersen, Nice (FR); Gilles Chaumont, Nice (FR)

(73) Assignee: Amadeus s.a.s., Biot (FR)

( * ) Notice: Subject to any disclaimer, the term of this patent is extended or adjusted under 35 U.S.C. 154(b) by 951 days.

(21) Appl. No.: 11/237,940

(22) Filed: Sep. 29, 2005

(65) Prior Publication Data

US 2007/0073563 A1 Mar. 29, 2007

(51) Int. Cl.
*G06Q 10/00* (2006.01)
(52) U.S. Cl. .................. 705/5; 705/6; 705/400
(58) Field of Classification Search .......... 705/5, 6, 705/400
See application file for complete search history.

(56) References Cited

U.S. PATENT DOCUMENTS

| | | | |
|---|---|---|---|
| 4,862,357 A * | 8/1989 | Ahlstrom et al. | 705/6 |
| 5,331,546 A * | 7/1994 | Webber et al. | 705/6 |
| 6,263,323 B1 * | 7/2001 | Baggett | 705/400 |
| 6,275,808 B1 * | 8/2001 | DeMarcken | 705/6 |
| 6,336,097 B1 * | 1/2002 | Scipioni | 705/6 |
| 6,377,932 B1 * | 4/2002 | DeMarcken | 705/5 |
| 6,609,098 B1 * | 8/2003 | DeMarcken | 705/6 |
| 6,839,679 B1 * | 1/2005 | Lynch et al. | 705/5 |
| 7,483,883 B2 * | 1/2009 | Barth et al. | 1/1 |
| 2002/0143587 A1 * | 10/2002 | Champernowne | 705/5 |
| 2002/0178034 A1 * | 11/2002 | Gardner et al. | 705/5 |
| 2003/0018500 A1 * | 1/2003 | Daughtrey | 705/5 |
| 2004/0078251 A1 * | 4/2004 | DeMarcken | 705/5 |
| 2004/0078252 A1 * | 4/2004 | Daughtrey et al. | 705/5 |
| 2005/0108068 A1 * | 5/2005 | Marcken et al. | 705/5 |
| 2007/0021989 A1 * | 1/2007 | de Marcken | 705/5 |
| 2007/0073563 A1 * | 3/2007 | Dourthe et al. | 705/5 |

FOREIGN PATENT DOCUMENTS

WO WO 01/29693 A2 4/2001

OTHER PUBLICATIONS

Paul Grimes, "Practical Traveler; Ways to save on Atlantic Flights," New York Times, Published Mar. 17, 1985, pp. 1-4.*
Flyertalk Forums, www.flyertalk.com, Published Dec. 9, 2004, pp. 3-8 of PDF.*
"Whats in a Fare," www.travelterminal.com, Published Jul. 15, 2004, pp. 1-3 of PDF.*
PRN Newswire "Delta Airlines celebrates Independent Day," published Jun. 29, 1998, pp. 2-3 of 3.*
Singaporean Search Report and Written Opinion dated Jul. 6, 2009.

* cited by examiner

*Primary Examiner* — John Hayes
*Assistant Examiner* — Brian Epstein
(74) *Attorney, Agent, or Firm* — Young & Thompson (57) ABSTRACT

A method and system for making roundtrip air flight reservations includes an end-user receiving a response having departure dates with a lowest cost outbound fare for each date and return dates with a lowest cost inbound fare for each date, outbound flight and inbound flight segments each priced with One Way Combinable fares, the One Way Combinable fares can be priced independently of all other One Way Combinable fares (i.e. restriction on covered segment, fare amount can be doubled to price the Round Trip) and can be combined together with any other One Way Combinable fare (i.e. no combinability restriction) in order to form a guaranteed pricing solution regarding IATA regulation both in domestic and international contexts for complex segments (i.e. based on non-direct flights).

9 Claims, 5 Drawing Sheets

```
    Parse end-user's travel itinerary request into
           independent requested segments.
                      Step 910

Price process, by parallel asynchronous computations,
each independent requested segment to determine each
              individual segment price.
                      Step 920

Output guaranteed pricing solutions for all independent
                requested segments.
                      Step 930

Total itinerary price determination by summing the
             individual segment price.
                      Step 940
```

| Washington – Paris: 15 July | |
|---|---|
| WAS - NYC (xx) + NYC - PAR(yy) | $550 |
| Paris – Washington : 22 July | |
| PAR - WAS (xx) | $340 |
| TOTAL AMOUNT | $890 |

| Washington-Paris | | | | | | |
|---|---|---|---|---|---|---|
| 12-Jul | 13-Jul | 14-Jul | 15-Jul | 16-Jul | 17-Jul | 18-Jul |
| $550 | $550 | $550 | $540 | $640 | $550 | $640 |

| Washington-Paris | | | | | | |
|---|---|---|---|---|---|---|
| 19-Jul | 20-Jul | 21-Jul | 22-Jul | 23-Jul | 24-Jul | 25-Jul |
| $590 | $340 | $41) | $340 | $340 | $340 | $410 |

Figure 6

| Washington- Paris : 15 July | | |
|---|---|---|
| Flight 1 | WAS - PAR (xx) | $540 |
| Flight 2 | WAS - NYC (xx) + NYC - PAR(yy) | $550 |
| Flight 3 | WAS - NYC (xx) + NYC - LON (yy) + LON - PAR (zz) | $580 |

| Paris- Washington : 22 July | | |
|---|---|---|
| Flight 1 | PAR - WAS (xx) | $340 |
| Flight 2 | PAR- NYC (yy) + NYC - (xx) | $350 |
| Flight 3 | PAR- LON (zz) + LON - NYC (yy) + NYC - WAS (xx) | $480 |

Figure 7

AIR TRAVEL SYSTEM AND METHOD FOR PLANNING ROUNDTRIP FLIGHTS USING ONE WAY COMBINABLE FARES

BACKGROUND OF THE INVENTION

The present invention provides a network-based air travel reservation system and method for making roundtrip air flight reservations using One Way Combinable fares ("OWC fares"). The invention includes a system and method allowing an end-user to make internet online air flight reservations for air travel with guaranteed pricing using OWC fares.

More specifically, for the end-user the present invention provides a method for rapidly responding to the end-user's travel itinerary request by successfully returning all pricing solutions for the requested itinerary through the use of parallel pricing processes launched on sub-itineraries (e.g., an outbound segment and a return inbound segment) of the itinerary request. Further, in the invention, all of returned pricing solutions will be fully guaranteed regarding international pricing standards (IATA regulation) through the use of the One Way Combinable fares.

The invention provides the end-user with an integrated system allowing interactive creation and pricing of a complete international trip solution (i.e., journey solution) through presentation of individual basic pricing solutions covering each of the outbound and return inbound segment of the end-user's requested itinerary, so that the sum of the pricing for each end-user selected basic pricing solution will be a total price amount for the entire trip with the total price amount being IATA regulation compliant.

For a travel provider, the invention includes techniques to interactively manage the One Way Combinable fares including the transformation of standard fares into the One Way Combinable fares which can be priced independently and combined together in order to form guaranteed complex priced solutions.

The invention provides the travel provider with a system that quickly and efficiently allows the travel provider to respond to the end-user's travel itinerary request with a proposal that includes a full complex pricing solution set by computing and displaying only a basic part of the full solutions set.

DESCRIPTION OF THE RELATED ART

Currently powerful air travel planning systems are systems that answer a full set of pricing solutions (flights combined to form the complete trip and fares applied on flights to give the full trip cost amount) within a few seconds to every trip request whatever its complexity and the number of flights and fares to be investigated.

Prior art air travel planning systems/methods for planning RoundTrip (RT) flights suffer in two general aspects:

i) combinatorial solution set explosion leading to incomplete solution set presentation (itinerary pricing mode), ii) incomplete solution domain search leading to invalid solution set presentation regarding general pricing rules for international trip requests (city-pair pricing mode).

Most of air travel planning systems in the prior art use a pricing by itinerary mode technique. This technique is based on the standard journey pricing procedure that tightly couples outbound trip solutions with return inbound trip solutions, and always considers the outbound and inbound solutions as a whole to determine pricing and to the guarantee trip solution to be IATA compliant. Indeed, pricing process of international trips is regulated by the document "Passenger Tariff Coordinating Conferences Resolutions Manual, Composite", which is issued the April 1st each year by the International Air Transport Association (IATA) and is approved unanimously by all IATA member airlines. A pricing solution is said to be "fully guaranteed" (or "IATA compliant") when it is the lowest one for a set of flights proposed and complies with all regulations defined therein.

Using such a method to successfully respond to the end-user's travel itinerary request, there are many flights that can be combined to satisfy an outbound or inbound segment, and combined in many different ways. Moreover, there are also many fares combinations possibilities in order to price each flight combination. Finally, each couple of Fare combination/Flight combination forms one travel itinerary solution that satisfies the travel itinerary request. The large number of combinatorial solution possibilities results in an explosion of possible travel itinerary solutions that renders the full solution set both costly for the travel provider to compute and costly for the travel provider to present to the end-user. Even if the travel provider did present the end-user with the full solution set, the full solution set would be overwhelming for the end-user to consider.

The prior art includes powerful low fare search ("LFS") products (e.g. Amadeus Master Pricer) that allow the travel provider to offer a large number of IATA compliant low fare trip solutions in response to the end-user's travel itinerary request. These products mainly use standard itinerary pricing mode in order to be fully guaranteed.

Combinatorial solution set explosion is a main drawback of these products talking into account the large number of both flight combinations and fares combinations necessary to consider in making a full search of the pricing domain that is necessary in order to determine a maximum number of best trip solutions in the lowest acceptable response time.

As a first concrete example of this problem, consider a RT request from origin location A outbound to destination location B and returning inbound back to origin location A, i.e., A->B->A. This example involves only two independent segments, a first outbound segment A->B and a second return inbound segment B->A.

Figure 1:
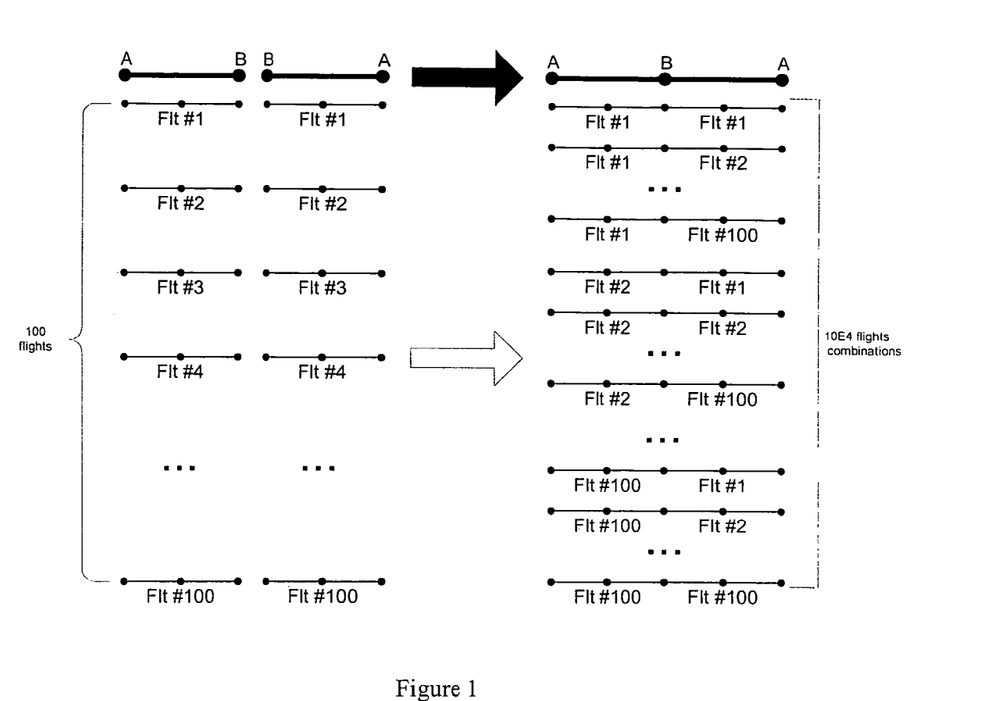
FIG. 1 illustrates flight combinations.

With reference to FIG. 1, if there are 100 (10E2) flights segments in each direction, then there are 10,000 (10E4) possible flight segment combinations for the RT itinerary. This means the full flight domain related to the end-user's simple travel itinerary request involves up to 10,000 flight segment combinations.

Figure 2:
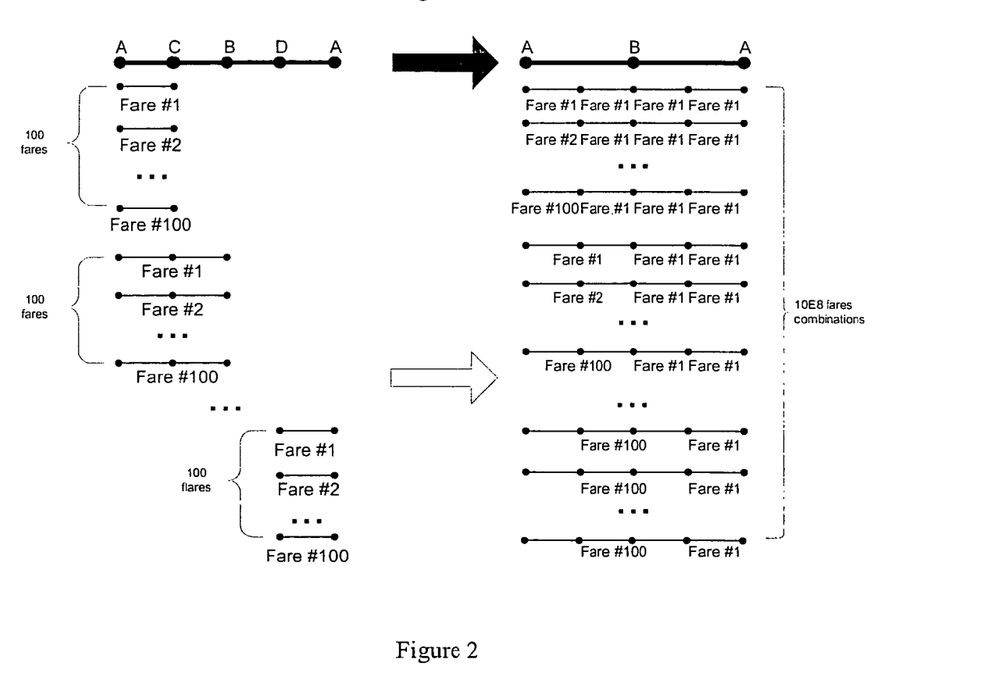
FIG. 2 illustrates fare combinations.

Regarding fare domain, with reference to FIG. 2, consider that each flight segment is made of non-direct flights (with one connecting non-stop point C for outbound and D for inbound). A fare can be connected on each market defined by a couple of cities (AB, AC, AD, BA, BC, BD, CD . . . ). Let's take 100 fares on each market. As illustrated by FIG. 2, there may be:

100 fares for the market A->B,
100 fares for the market A->C,
100 fares for the market A->D,
100 fares for the market B->A,
100 fares for the market B->C, and so on.

Pricing by itinerary pricing mode and its regulation allows creating up to 10E8 fare combinations (see Upper Limits calculation in appendix before the claim set).

Thus, when considering both the flight combinations and the fare combinations, the true full set of pricing solutions to the end-user's travel itinerary request involves up to 10E12 trip solutions (i.e., flights combinations×fares combinations). This is a daunting task for the travel provider to process and potentially display in a short time period that would be satisfactory to the end-user, i.e., with a few seconds.

The prior art can not handle such a large number of solutions. Indeed, even if the computational capacity and network bandwidth were available, solving this combinatory problem and presenting the entire solution set would be too expensive to be economically feasible. As a consequence, the prior art has not responded to the end-user's travel itinerary request with the true full solution set but with a part of it. Amadeus Master Pricer returns up to 200 guaranteed solutions for example.

In addition to this drawback that provide incomplete set of solution sets, another drawback of the prior art is that for the end-user the incomplete solution set still provides too large a number of travel options in order to easily find a suitable combination of convenient flight times for both outbound and inbound segments at an acceptable cost.

One approach taken by the prior art (e.g. Amadeus Easy Roundtrip) defines a pricing method based on the itinerary mode that groups flights with the same pricing characteristics. The main flight is directly processed inside a pricing engine and, if needed, all other grouped flights are developed from factorized set of flights. This approach reduces the search domain that is processed and thus allows the travel provider to display more solutions at a reduced cost. Further, no modification of fares is performed.

This approach is an incomplete solution in that the drawbacks of this approach are same drawbacks as traditional full solution method (excessive solution time and high costs). This approach has attempted to address the combinatory problem, but only for a particular case and suffers when there is an increase in the number of flights to consider, particularly when there are new routing, new availability contexts.

The prior art has also sought to tackle the combinatory problem related to the itinerary mode by reducing the complexity of the search domain by considering independently each requested segment and not the whole itinerary through systems and methods using pricing by city-pair mode. This pricing by city-pair mode is exemplified by low cost airlines products or Amadeus Flex Pricer.

The pricing by city-pair mode allows the end-user to generate sequentially, for each requested city pair segment of the itinerary (e.g. city pair+date), a number of separated and independent flight segments. The end-user is then able to choose independently develop a pricing solution for each city pair in order to form a complete trip solution.

The city pair method simplifies pricing context by only processing itinerary selections filled with non-complex set of flights (direct or one single connection) and only for domestic requests. Indeed, for this context IATA recommendations have not to be taken into account as only domestic trips will be priced.

A main drawback of the city pair method is the simplified application domain. This improvement is not adaptable to international travel requests which represents the main part of world traffic, does not cover complex connections of flights, and does not respect standard journey pricing (IATA regulation) which could induce errors on displayed pricing amounts.

Another drawback of sequential pricing processing is the comparative high processing cost (in both time and money) of using all synchronous processing.

In the prior art, there are too many flight combinations and fare combinations travel that are synchronously processed. These prior art approaches are for the travel providers costly to process, time consuming, and inefficient in presentation to the end-user.

SUMMARY OF THE INVENTION

The present invention provides improvement over the prior art systems and methods by providing a system and method for making roundtrip air flight reservations using One Way Combinable fares ("OWC fares"), allowing the end-user to make reservations fully guaranteed regarding IATA rules.

The invention advances the art by providing a method rapidly responding to the end-user's travel itinerary request and successfully returning all requested pricing solutions by using parallel pricing processes launched on sub-itineraries of the itinerary request (the sub-itineraries for a roundtrip flight reservation are the outbound segment and the return inbound segment).

Returned pricing solutions are fully guaranteed for international pricing standards (IATA regulations) through the use of the One Way Combinable fares.

Full trip solution sets are efficiently presented to the end-user as individual basic pricing solutions covering each itinerary segment, with the sum of the pricing for each segment solution being an IATA regulation compliant total price amount for the entire trip. A basic pricing solution is a priced segment; that is, a basic pricing solution is the price amount for a flight or combination of flights that make up a complete outbound flight segment or inbound flight segment. Thus, a WAS-PAR flight with a fare of $540 is a basic price solution and a WAS-NYC+NYC-PAR with a fare of $550 is another basic price solution for a WAS-PAR outbound segment. A trip (journey) solution would be comprised of all the basic pricing solutions for the outbound segment and all the basic pricing solutions for the return inbound segment of the WAS-.PAR->WAS trip.

The invention includes techniques to allow the travel provider to interactively manage the One Way Combinable fares including the transformation of standard fares into updatable One Way Combinable fares which can be priced independently and combined together in order to form guaranteed complex priced solutions.

The invention also provides the travel provider with a system that quickly and efficiently allows the travel provider to respond to the end-user's travel itinerary request with a proposal that includes a full complex pricing solution set by computing and displaying only a basic part of the full solutions set. Association of each basic solution set will define the full solution set covering the RT flight request.

DESCRIPTION OF THE PREFERRED EMBODIMENTS

For ease of understanding, embodiments of the invention will be described with respect to an example end-user's travel itinerary request for roundtrip travel from Washington, D.C. (WAS) to Paris, France (PAR) and returning to Washington, D.C. The end-user has a departure dates window of July 12th through July 18th and a return dates window of July 19th through July 25th.

Thus, the end-user's travel itinerary request comprises a first outbound flight segment from WAS to PAR and a second return inbound flight segment from PAR to WAS. A solution to this request will comprise a guaranteed total itinerary price amount for the combination of the first and second flight segments.

Preferred embodiments of the invention include parallel pricing. First, in order to reduce processing time, the end-user's travel itinerary request is parsed into independent requested segments by extracting each independent requested segment. See step 910 of FIG. 9 and OW Extractor 510 of FIG. 5.

To further reduce processing time and time cost, the invention uses price processing by parallel asynchronous computations of the independent requested segments. That is, parallel pricing processes are launched based on OWC fares for each independent requested segment. See step 920 of FIG. 9 and LFS Pricing Engines 520 of FIG. 5.

Asynchronously pricing each independent requested segment, in parallel on separate pricing engines, results in only a single low fixed time cost associated with total pricing time. This single time cost for total pricing time under the invention is comparable to the time cost of a single segment pricing process in the sequential pricing engines of the prior art where the whole pricing process was done sequentially one requested segment after another requested segment and the total pricing time cost was the sum of the individual pricing time costs.

The parallel asynchronous computation the invention quickly provides the end-user a display indicating all flights requested. By way of comparison with the prior art itinerary pricing mode, the end-user's travel itinerary request illustrated by FIGS. 1-2 requires 10E12 pricing solutions to be processed in order to form all potential end-user solutions (10E4 of FIG. 1 times 10E8 of FIG. 2). With independent pricing computed in parallel, the invention processes only the 10E8 pricing solutions (see Upper limits calculation below), thereby decreasing the solution search domain by a 10E4 factor. Thus, memory and computation time costs are greatly reduced.

Preferred embodiments of the invention also include One Way Combinable fares (OWC fares). The use of OWC fares ensures that all computed pricing solutions will be guaranteed regarding standard trip pricing procedure without any prior art simplification of search domain (complex connections, international requests).

Standard fares in pricing process are defined by internal characteristics (fare type, fare amount) related to constraints on combinability with other fares, applicability with passenger types, availability of priced segment, routing of priced segment etc. More over IATA regulation implies some restriction on segment not covered by the fare (cross segment restrictions for example).

One Way Combinable fares are a defined fare classification of fares wherein each OWC fare can be priced independently of all other OWC fares (only restriction on covered segment, fare amount can be doubled to price the RT) and each OWC fare can be combined together (no combinability restriction) with any other OWC fare in order to form a guaranteed pricing solution both for in domestic and international contexts (i.e., guaranteed pricing regarding IATA regulation) for travel ticketed in country of trip origin (very weak constraint). The One Way Combinable fares of each airline are combinable, without fare restriction, with the One Way Combinable fares of the other airlines. The One Way Combinable fares each have a guarantee fare amount applicable to complex segments (i.e., based on non-direct flights) and conforming with IATA regulation.

OWC Fare pricing mode allows a guaranteed total itinerary pricing by summing the individual segment prices, e.g., summing the price amount for the first outbound WAS->PAR segment and the price amount for the second return inbound PAR->WAS segment.

Again with reference to FIGS. 5 and 9, step 920 is executed by reference to the OWC Fare Database 530 to determine each individual segment price amount. The OWC Fare Database 530 is maintained by Airfare Providers 540. In step 930, LFS Engines addressing OWC Fare Database outputs the guaranteed pricing solutions for all independent requested segments. The fare database is comprised of domestic and international One Way Combinable fares.

Figure 9:
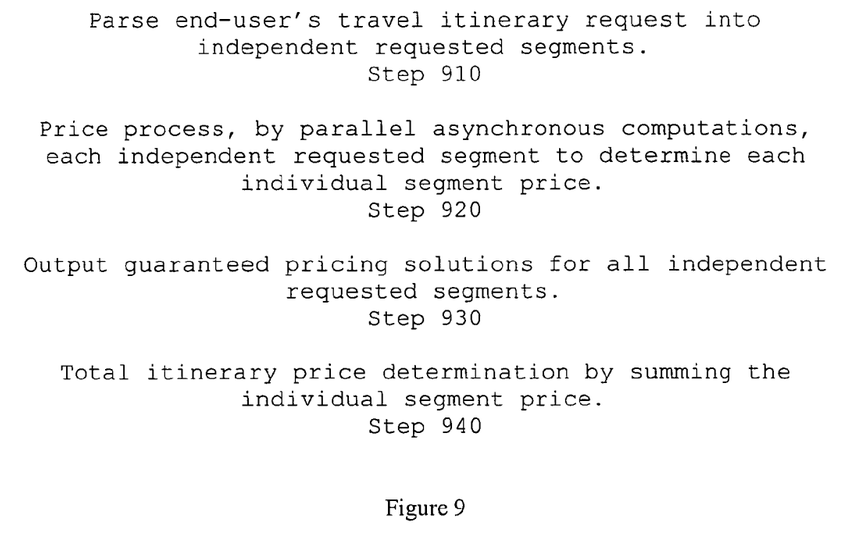
FIG. 9 is a flowchart illustrating certain features of the invention.

In step 940, all pricing solutions can be output for itinerary request. The guaranteed total itinerary price amount for each pricing solution is determined by summing all the individual segment prices, i.e., summing the individual segment price amount for the first outbound segment with the individual segment price amount for the second return inbound segment. Therefore, the price amount for the total itinerary is the sum of the amounts of each segment by only applying OWC Fare on each one. This simple operation (price amount [Segment 1+Segment 2]=price amount Segment 1+price amount Segment 2) that keeps the consistency of total price amount regarding IATA regulation is systematically allowed using OWC Fares but cannot be fully guaranteed with standard fares. For example, cross segment restrictions applied to standard fares will require the knowledge of Segment 1 to compute price amount of Segment 2. In this case a sequential pricing approach has to be performed in order to compute total price amount (i.e. not parallel computation). Otherwise total price will be incorrect.

Figure 3:
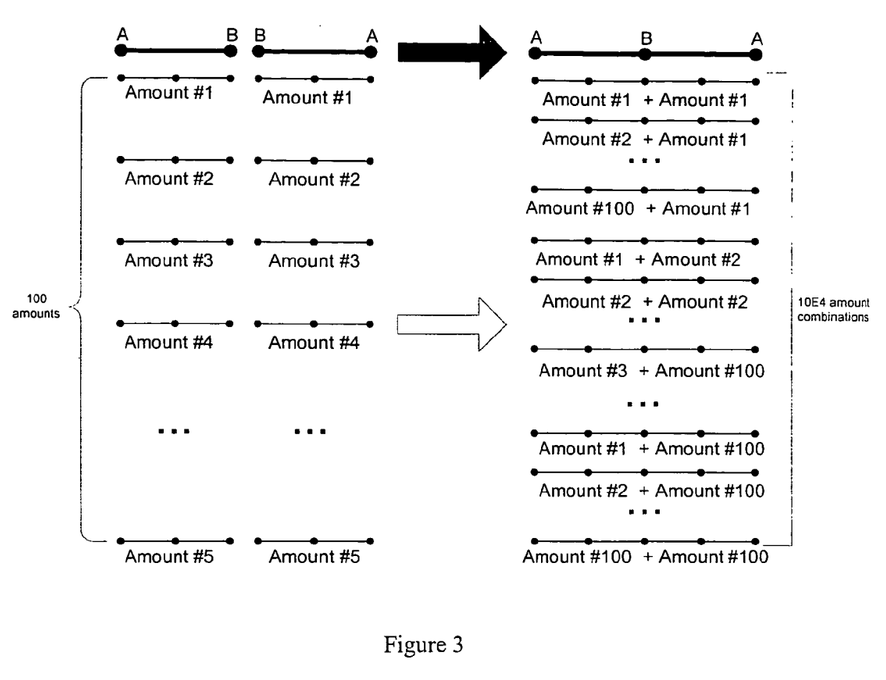
FIG. 3 illustrates amount combinations.

As was discussed with respect to FIGS. 1-2, consider the case where there are 100 conventional fares on each studied market. These 100 conventional fares, upon being converted to OWC fares, allow that there are 100 price amounts for each of the first outbound flight segment and the second return inbound flight. As illustrated by FIG. 3, this results in a total of 10,000 (10E4) amount combinations or pricing solutions covered by only 2×100 amount computations. In itinerary pricing mode, the full set of amounts (10,000) would be necessary to obtain all solutions. Here is a significant gain of memory and time costs (factor 100).

Another feature of preferred embodiments of the invention is an OWC Fare Converter. Reference is made to OWC Fare Converter 400 of FIG. 4.

The OWC Fare Converter provides an interactive technique/system that allows the airfare provider to create OWC fares for use in RT flights requests ticketed in country of trip origin. The OWC Fare Converter also allows the airfare provider to convert old fares (analyze/update) already used in the airfare provider's production.

The OWC Fare Converter includes a fare checking technique that sequentially applies on each fare several checks to ensure the main properties of an OWC fare.

The OWC Fare Converter may provide that candidate fare can be combined with any other fares.

The OWC Fare Converter may provide that candidate fare does not have restriction over all segments different than covered one.

The OWC Fare Converter may provide that candidate fare is not candidate to IATA checks that will change the total amount.

The OWC Fare Converter may provide that candidate fare is a single direction one (One Way fare) that can be doubled to form Roundtrip.

Figure 4:
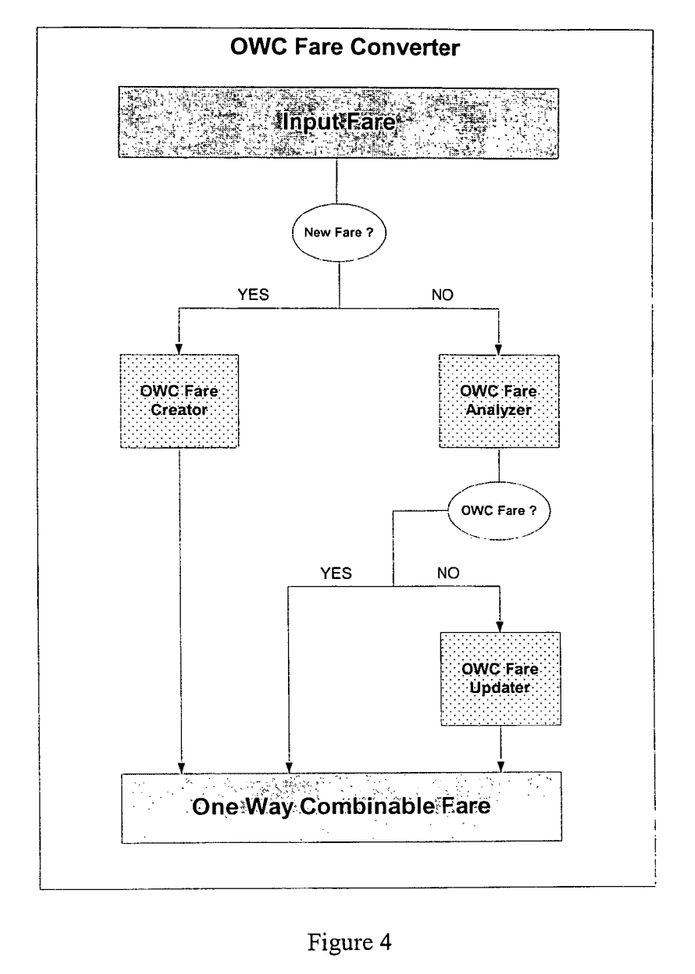
FIG. 4 illustrates an OWC Fare Converter.

The OWC Fare Converter is comprised of three main modules that respectively apply three main processes on an input fare: an OWC Fare Creator 410, an OWC Fare Analyzer 420, and an OWC Fare Updater 430.

The OWC Fare Creator module creates a new input fare with OWC fare concept properties with the input fare created and flagged as an OWC fare.

The OWC Fare Analyzer module analyzes an existing input fare regarding compliance with OWC fare concept properties to determine whether the existing input fare is suitable for flagging as an OWC fare. An existing input fares that do not fit required OWC fare properties will not be flagged as OWC fares.

The OWC Fare Updater module updates an existing input fare not yet flagged OWC fare for conversion into an OWC fare. The OWC Fare Updater module is interactive so that the airfare provider can be asked to perform changes on the existing input fare filing in order to ensure compliance with OWC fare properties. At any time, the airfare provider can quit the OWC Fare Updater resulting in the existing input fare not being converted and flagged as an OWC fare. At the end of the OWC Fare Updater processing, a successfully updated fare is flagged as an OWC fare and enters the One Way Combinable Fare group 440.

Another preferred embodiment of the invention enables the travel provider to allow the end-user create and price amount sequentially and interactively their own international complete trip solution. End-user priced solutions result from the composition of basic pricing solutions, each basic pricing solution covering a segment of the end-user requested itinerary. This finds application in Low Fare Search (LFS) products.

Figure 5:
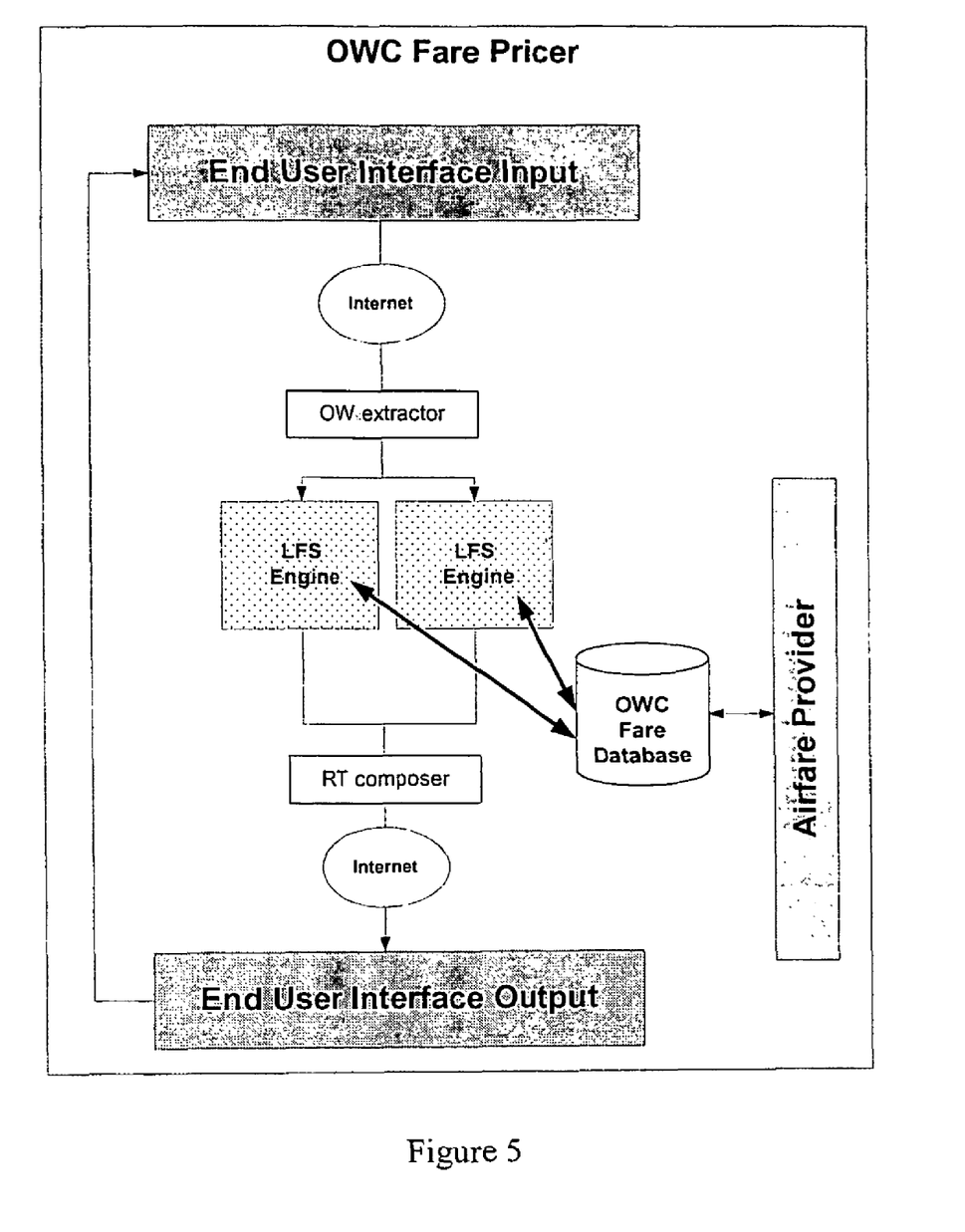
FIG. 5 illustrates an OWC Fare Pricer.

With reference to FIG. 5, there is illustrated an OWC Fare Pricer 500 for use with the OWC fare method.

A conventional end-user interface, comprised of an interface input 504 and an interface output 505, is provided for use by the end-user. The end user interface inputs and outputs via a network, e.g., the Internet 506. The input interface is connected, via the network, to the OW extractor 510.

The OW Extractor analyzes the end-user's itinerary request. The OW Extractor extracts One Way segment information by parsing the end-user's travel itinerary request into independent requested One Way segments that can be priced independently with OWC fares. Further, with Round Trip Composer, each price amount of an independent segment will be added together to form the total price amount of itinerary guaranteed regarding IATA regulation. For a Round-Trip, OW Extractor process can lead to 1 or 2 independent OW segments. Only one independent segment (Round Trip) is obtained when the OW Extractor is unable to extract an outbound segment and an inbound segment. See Step 910 of FIG. 9.

It is not always possible for the OW Extractor to extract two segments (inbound and outbound). Sometimes, the OW Extractor analysis leads to the conclusion that no pair of outbound/inbound segments is available. In that case, the request is processed without division of outbound/inbound segment and a complete Round Trip segment is processed. Thus, the OW Extractor first analyses the ability to extract two segments for one way segment information (including an outbound segment and an inbound segment), and, if possible, the OW Extractor extracts the one way segment information.

An output side of the OW Extractor is connected to input sides of the LFS Pricing Engines 520. Price processing is accomplished by parallel asynchronous computations of each of the LFS Pricing Engines to determine, for each requested segment, individual segment prices. Each LFS Pricing Engine is in bilateral communication with the OWC Fare Database to communicate the segment fare data. Together, these elements perform steps 920 and 930 of FIG. 9.

The RT Composer (Roundtrip Composer) is fed input from the LFS Pricing Engines and gathers all LFS Pricing Engines' results in order to form itinerary solutions.

The RT Composer, in step 940, outputs all basic pricing solutions that satisfy the end-user's itinerary request.

Figure 6:
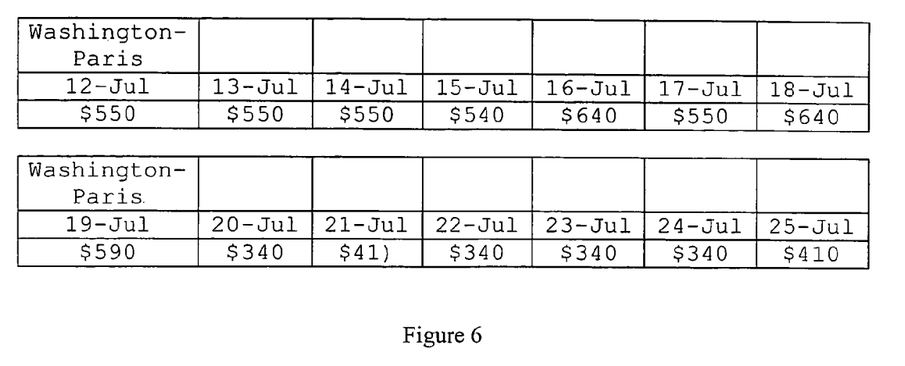
FIG. 6 illustrates an end-user response display showing departures dates for both the outbound and return inbound flights.

With reference to FIG. 6, the RT Composer provides to the End User Interface Output an end-user response display that shows multi-day departures for both the outbound and return inbound flights. This display represents a composition of basic pricing solutions, each basic pricing solution covering a segment of the end-user requested itinerary and showing the lowest segment cost for each day.

Although FIG. 6 illustrates pricing solutions returned on a one way (OW) basis, the invention may also return pricing solutions on a roundtrip (RT) basis. RT basis pricing solutions would show full priced itineraries whereas the OW basis pricing solutions show separated priced segments for each of the outbound and inbound segments.

A display on an OW basis allows the end-user to price their trip by clicking separately on the first segment price amount and on the second segment price amount. The end-user clicking on July $15^{th}$ and then on July $22^{nd}$ will result in the display of FIG. 7, an end-user response display that shows single-day departures for both the outbound and return inbound flight segments. In this example, three flights are offered for each segment.

Figure 8:
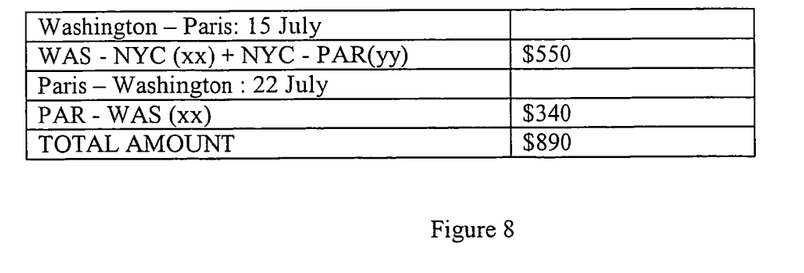
FIG. 8 illustrates an end-user selected itinerary with a selected outbound flight segment and a selected return inbound flight segment.

If the end-user clicks on Flight 2 of the July $15^{th}$ outbound segment and Flight 1 of the July $22^{nd}$ inbound segment, the display of FIG. 8 is returned by the RT composer.

FIG. 8 illustrates an end-user selected itinerary with a selected outbound flight segment priced at $550 and a selected return inbound flight segment priced at $340. The guaranteed total itinerary price amount is the sum of the individual segments, i.e., $890. Thus, due to the use of the OWC fares, the guaranteed total itinerary price amount is determined by summing all the selected individual segment prices.

In this example, the travel provider benefits from reduced computation cost and time in that the RT composer only needs to create and present 14 pricing computations (7 for the outbound segment and 7 for the inbound segment) as opposed to the necessary 49 priced solutions (7*7) required by the prior art using pricing by itinerary mode technique.

Advantageously, OWC fares can be used with standard fares. OWC fares guarantee fare pricing (in complex international segments) with respect to IATA regulations. Such guaranteed fare pricing assures the OWC fare segments are cost certain regardless the other non-OWC fare segments being purchased.

One embodiment of the invention can be appreciated from the end-user's point of view.

With reference to FIG. 5, the end-user enters, via the end-user interface input 504 of the user's network terminal, a roundtrip air flight itinerary request. The network terminal may be a computer, e.g., a personal computer wire or wireless connected to the internet or to an internet protocol network. The network terminal may also be a network-enabled phone or other terminal connected either permanently or temporarily to the LSF Pricing Engines via an appropriate network. The invention is operative on many network types including, but not limited to, the Internet, an internet protocol network, a communications network, and a wireless network.

The itinerary request indicates i) an origination city (e.g., WAS), ii) a destination city (e.g., PAR), iii) a departure dates time frame for an outbound flight segment from the origination city to the destination city (e.g., July 12-18), and iv) a return dates time frame for a return inbound flight segment from the destination city to the origination city (e.g., July 19-25). The itinerary request is sent from the network terminal to the reservation system over the network 506.

After action of the LFS Pricing Engines 520 and RT composer as described above, the end-user receives from the reservation system, via the end-user interface output 505 of the network terminal, an end-user response display. See FIG. 6.

As shown by FIG. 6, the end-user response display comprises i) a first multi-day travel dates set corresponding to the departure dates time frame (July 12-18), and consisting essential of, for each date of the first dates set, a price amount corresponding to a lowest cost of an outbound flight of the outbound flight segment for that date. For example, July $15^{th}$ has a lowest cost of the outbound flight of $540.

Also as shown by FIG. 6, the end-user response display also comprises ii) a second multi-day travel dates set corresponding to the return dates time frame (July 19-25), and consisting essential of, for each date of the second dates set, a price amount corresponding to a lowest cost of an inbound flight of the return inbound flight segment for that date. For example, July $22^{nd}$ has a lowest cost of the inbound flight of $340.

As noted above, the outbound flight segment and the return inbound flight segment are each priced with One Way Combinable fares, obtained from the OWC fare database 530. The One Way Combinable fares of each airline are combinable, without fare restriction, with the One Way Combinable fares of the other airlines. The One Way Combinable fares each have a guarantee fare amount applicable to complex segments (i.e., based on non-direct flights) and conforming with IATA regulation.

With continued reference to FIG. 6, the end-user then completes a dates selecting step of selecting a departure date from the first dates set and a return date from the second dates set. In the illustrated example, July $15^{th}$ and July $22^{nd}$ are selected as the departure date and the return date.

In response to the dates selecting step, the end-user receives an end-user response display (FIG. 7) showing plural alternative outbound flights making up the outbound flight segment for the departure date (July $15^{th}$) and showing plural alternative inbound flights making up the return inbound flight segment for the return date (July $22^{nd}$). The display also shows a price amount for each of the alternative outbound and inbound flights. For July $15^{th}$, the price amounts are $540, $550, and $580 for each of Flights 1-3 respectively. For July $22^{nd}$, the price amounts are $340, $350, and $480 for each of Flights 1-3 respectively.

Figure 7:
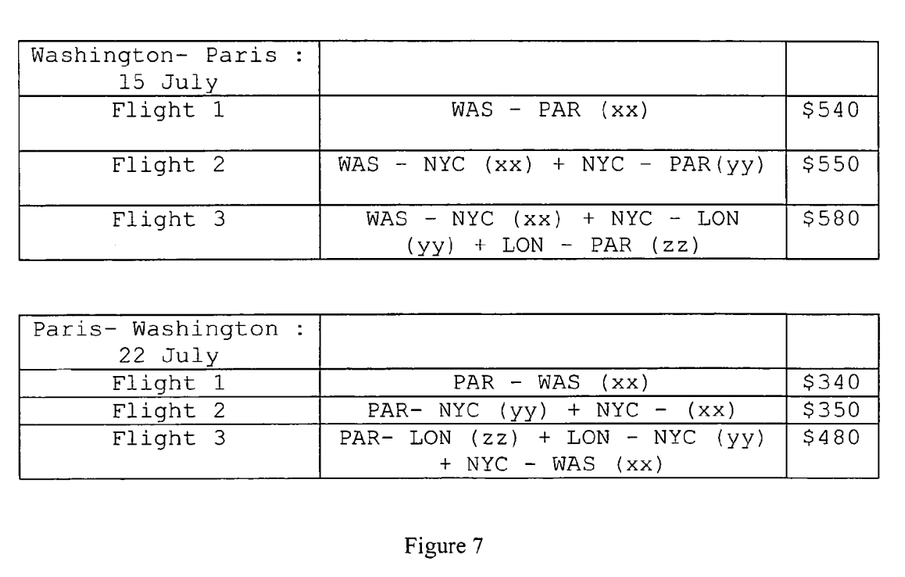
FIG. 7 illustrates an end-user response display showing single-day departures for both the outbound and return inbound flight segments.

From the display of FIG. 7, the user completes a flight selecting step of selecting one of the outbound flights at a first price amount and selecting one of the inbound flights at a second price amount.

If the user selects outbound Flight 2 and inbound Flight 1, FIG. 8 shows the response. Responsive to the flight selecting step, the end-user receives an end-user selected itinerary (FIG. 8) comprised of the selected outbound Flight 2 and the selected inbound Flight 1. The price amount of Flight 2 is $550 and the price amount of Flight 1 is $340. The guaranteed total itinerary price amount of the selected itinerary is the sum of the first price amount and the second price amount, i.e., $890 in this example. This simple operation (price amount [Segment 1+Segment 2]=price amount Segment 1+price amount Segment 2) that keeps the consistency of total price amount regarding IATA regulation is systematically allowed using OWC Fares but cannot be fully guaranteed with standard fares. For example, cross segment restrictions applied to standard fares will require the knowledge of Segment 1 to compute price amount of Segment 2. In this case a sequential pricing approach has to be performed in order to compute total price amount (i.e. not parallel computation). Otherwise total price will be incorrect.

The selected outbound flight may be a direct (non-stop) or a non-direct outbound flight from the origination city to the destination city. If the outbound flight is a non-direct outbound flight (as shown in FIG. 8), the outbound flight may be comprised of two One Way Combinable fares of different airlines.

With reference to FIGS. 5 and 9, the reservation system receives the end-user itinerary request from the end-user. The reservation system parses the received end-user itinerary request into requested segments comprised of the outbound flight segment from the origination city to the destination city, and the return inbound flight segment from the destination city to the origination city (step 910).

The reservation system price processes (step 920) the requested segments, by parallel asynchronous computations, based on the One Way Combinable fares for flights corresponding to the outbound flight segment and for flights corresponding to the inbound flight segment (see LFS Pricing Engines 520 and OWC Fare Database 530).

Advantageously, the OWC Fare Database is established, in advance of the reservation system receiving the end-users itinerary request. The OWC Fare Database is comprised of the One Way Combinable fares, each One Way Combinable fare comprised of a fare price amount. For the illustrated outbound Washington-Paris flight segment, for July $15^{th}$, there are three One Way Combinable fares corresponding to Flights 1-3 of FIG. 7. For the illustrated inbound Paris-Washington flight segment, there are further three One Way Combinable fares.

Although in this example the outbound and inbound flights have different price amounts, this need not be the case. Some One Way Combinable fares have the same price amount for each direction. For example, for July $15^{th}$, the outbound Flight 1 is shown with a price amount of $540. For July $15^{th}$, the inbound Flight 1 (not shown) also has a price amount of $540. In this way, when using the same flight for both the outbound and inbound segments, a roundtrip can be calculated by doubling the price amount of a single flight.

Upper Limits Calculation $n_{farecombi}$ is the upper limit of the total Fare combinations number for a trip build over 2 requested segments.

Each requested segment has ns stops by connection ($ns_1$ and $ns_2$).

$n_{fare}$ is the average number of fares applied on a City Pair.

Then, based on itinerary pricing mode:

$$n_{farecombi} = n_{fare} * (n_{fare}+2)^{ns_1+ns_2-1}$$

$n_{flightcombi}$ is the upper limit of the total Flight combinations number for a 2 segments request.

Each requested segment has nc connections ($nc_1$ and $nc_2$). Then, based on itinerary pricing mode:

$$n_{flightcombi} = nc_1 * nc_2$$

Finally, $n_{solution}$ is the upper limit of the total solutions number investigated for a 2 segments request.

Then, based on itinerary pricing mode:

$$n_{solution} = n_{flightcombi} * n_{farecombi}$$

$$n_{solution} = (nc_1 * nc_2) * (n_{fare} * (n_{fare} + 2)^{ns1+ns2-1})$$

For RT request priced with itinerary pricing mode, we take in our example:

$n_{fare}=100$, $nc_1=nc_2=100$, $ns_1=ns_2=2$ thus $n_{solution}=10E12$.

For RT request priced with OWC fare pricing mode, we take in our example:

$n_{fare}=100$, $nc_1=nc_2=100$, $ns_1=ns_2=1$ thus $n_{solution}=10E8$ for each segment computed.

The invention claimed is:

1. A network-based travel reservation system, comprising:
   an end-user device, the end-user device, in response to a round trip request, receives end-user air travel itinerary;
   asynchronous parallel processing devices programmed to provide:
   a One Way Combinable fare converter, the One Way Combinable fare converter including an interactive system wherein airfare providers create One Way Combinable fares in roundtrip flights requests ticketed in a country of trip origin, each One Way Combinable fares being combinable together with any other One Way Combinable fare, free of combinability restriction, forming a guaranteed pricing solution complying with roundtrip rules both in domestic and international contexts including complex inbound and outbound segments, the complex inbound and outbound segments being based on non-direct flights;
   a One Way Fare database connected to the first One Way Combinable fare converter, the One Way Fare database comprising the One Way Combinable fares, the One Way Combinable fares comprising i) segment fare data including pricing rules, said pricing rules comprising each One Way combinable fare is without fare restrictions to be combined with another One Way Combinable fare in roundtrip flights requests ticketed in a country of origin and ii) segment price amount data;
   a first low fare search pricing engine in bilateral communication with the One Way Fare database and configured to retrieve i) the segment fare data including the pricing rules and ii) segment price amount data;
   a second low fare search pricing engine in bilateral communication with the One Way Fare database and configured to retrieve i) the segment fare data including the pricing rules and ii) segment price amount data; and
   a One Way Combinable fare pricer comprising
      an internet input receiving the end-user air travel itinerary request; and
      a one way extractor with i) an input connected to the internet input, the one way extractor configured to parse the received end-user air travel itinerary request to extract one way segment information including the outbound segment and the inbound segment from the received end-user air travel itinerary request, and ii) an output connected to input sides of the first and second low fare search pricing engines, the output of the one way extractor providing the outbound segment to the first low fare search pricing engine having means for price processing the outbound segment to determine plural outbound segment determined One Way Combinable fares and associated respective fare price amounts corresponding the outbound segment and the inbound segment to the second low fare search pricing engine having means for price processing the inbound segment to determine plural inbound segment determined One Way Combinable fares and associated respective fare price amounts corresponding the inbound segment to accomplish parallel asynchronous price amount computations of each of the outbound segment and the inbound segment,
   wherein each outbound segment determined One Way Combinable fare is combinable together only with any other inbound segment determined One Way Combinable fare, free of combinability restrictions of a combinability restriction between each combined outbound segment determined One Way Combinable fare and inbound segment determined One Way Combinable fare, forming a guaranteed pricing round trip solution complying with said roundtrip rules both in domestic and international contexts including complex inbound and outbound segments of the end-user air travel itinerary request,
   the One Way Combinable fares are created by a plurality of airlines or airfare providers and the One Way Combinable fares of each airline are combinable with the One Way Combinable fares of other airlines without fare restriction.

2. The system of claim 1,
   wherein at least one of the asynchronous parallel processing devices is further configured as a roundtrip composer and connected to output sides of the first and second low fare search pricing engines, the roundtrip composer being fed input from the first and second low fare search pricing engines concerning all flights that satisfy the outbound segment and the inbound segment and corresponding price amounts, each flight that satisfies one of the outbound segment and the inbound segment being a segment basic pricing solution.

3. The system of claim 2, wherein,
   the roundtrip composer, via the internet, outputs to the end-user device all basic pricing solutions that satisfy the end-user's itinerary request.

4. The system of claim 3, wherein,
   the roundtrip composer forwards the basic pricing solutions as an end-user response display showing multi-day departures for both outbound and return inbound flights,
   the display receives input from the end-user to select a departure date and a return date,
   in response to the end-user selecting the departure and return dates, flights for the selected dates are shown form the outbound segment and the inbound segment,
   the shown flights being selectable by the end-user to form an itinerary reservation with a sum of a selected outbound flight price amount and a selected return inbound flight price amount being a guaranteed total itinerary price amount.

5. The system of claim 1, wherein, the One Way Combinable fare converter further comprises the airfare provider converting old fares already existing in the airfare provider's production into one way combinable fares, the old fare to be converted being a candidate fare for conversion.

6. The system of claim 5, wherein,
   the One Way Combinable fare converter includes a fare checking technique that sequentially applies on the candidate fare checks to ensure main concept properties of an OWC fare are satisfied, including that the candidate fare can be combined with any other fare, that the candidate fare does not have restriction over all segments different than covered one, that the candidate fare is not a candidate to roundtrip rule checks that will change the total amount, that candidate fare is a single direction fare that can be doubled to form a roundtrip fare.

7. The system of claim 5, wherein, the One Way Combinable fare converter comprises:
an OWC Fare Creator module;
an OWC Fare Analyzer module; and
an OWC Fare Updater module, wherein,
the OWC Fare Creator module creates a new input fare with OWC fare concept properties with the input fare created and flagged as an OWC fare,
the OWC Fare Analyzer module analyzes an existing input fare regarding compliance with OWC fare concept properties to determine whether the existing input fare is suitable for flagging as an OWC fare, an existing input fare that does not fit required OWC fare properties will not be flagged as OWC fares, and
the OWC Fare Updater module updates an existing input fare not yet flagged as an OWC fare for conversion into an OWC fare.

8. The system of claim 7, wherein,
the OWC Fare Updater module is interactive with the converter prompting the airfare provider to perform changes on the existing input fare in order to ensure compliance with OWC fare properties, and
at the end of the OWC Fare Updater processing, a successfully updated fare is flagged as an OWC fare.

9. A network-based travel reservation system, comprising:
an end-user device, the end-user device, in response to a request receives end-user air travel itinerary;
asynchronous parallel processing devices programmed to provide:
a One Way Combinable fare converter, the One Way Combinable fare converter including an interactive system wherein airfare providers create One Way Combinable fares in roundtrip flights requests ticketed in a country of trip origin, each One Way Combinable fares being combinable together with any other One Way Combinable fare, free of combinability restriction, forming a guaranteed pricing solution complying with roundtrip rules both in domestic and international contexts including complex inbound and outbound segments, the complex inbound and outbound segments being based on non-direct flights;
a One Way Fare database connected to the first One Way Combinable fare converter, the One Way Fare database comprising the One Way Combinable fares, the One Way Combinable fares comprising i) segment fare data including pricing rules, said pricing rules comprising each One Way combinable fare is without fare restrictions to be combined with another One Way Combinable fare in roundtrip flights requests ticketed in a country of origin and ii) segment price amount data;
a first low fare search pricing engine in bilateral communication with the One Way Fare database and configured to retrieve i) the segment fare data including the pricing rules, in roundtrip flights requests ticketed in a country of origin and ii) segment price amount data;
a second low fare search pricing engine in bilateral communication with the One Way Fare database and configured to retrieve i) the segment fare data including the pricing rules and ii) segment price amount data; and
a One Way Combinable fare pricer comprising
an internet input receiving the end-user air travel itinerary request; and
a one way extractor with i) an input connected to the internet input, the one way extractor configured to parse the received end-user air travel itinerary request to extract one way segment information including the outbound segment and the inbound segment from the received end-user air travel itinerary request, and ii) an output connected to input sides of the first and second low fare search pricing engines, the output of the one way extractor providing the outbound segment to the first low fare search pricing engine having means for price processing the outbound segment to determine plural outbound segment determined One Way Combinable fares and associated respective fare price amounts corresponding the outbound segment and the inbound segment to the second low fare search pricing engine having means for price processing the inbound segment to determine plural inbound segment determined One Way Combinable fares and associated respective fare price amounts corresponding the inbound segment to accomplish parallel asynchronous price amount computations of each of the outbound segment and the inbound segment, and
wherein the end user device comprises i) display means, said display means configured to present a list of outbound segment determined One Way Combinable fares and associated respective fare price amounts for the outbound segment and a list of inbound segment determined One Way Combinable fares for the inbound segment and associated respective fare price amounts, ii) selection means for the user to select one of the outbound segment determined One Way Combinable fares and one of the inbound segment determined One Way Combinable fares,
wherein each outbound segment determined One Way Combinable fare is combinable together only with any other inbound segment determined One Way Combinable fare, free of combinability restrictions between each combined outbound segment determined One Way Combinable fare and inbound segment determined One Way Combinable fare, forming a guaranteed pricing round trip solution the price of which is the sum of the fare price amounts of the outbound segment determined One Way combinable fare and the inbound segment determined One Way combinable fare, said guaranteed pricing round trip solution ticketed in the country of trip origin,
the One Way Combinable fares are created by a plurality of airlines or airfare providers and the One Way Combinable fares of each airline are combinable with the One Way Combinable fares of other airlines without fare restriction.

* * * * *